UNITED STATES PATENT OFFICE.

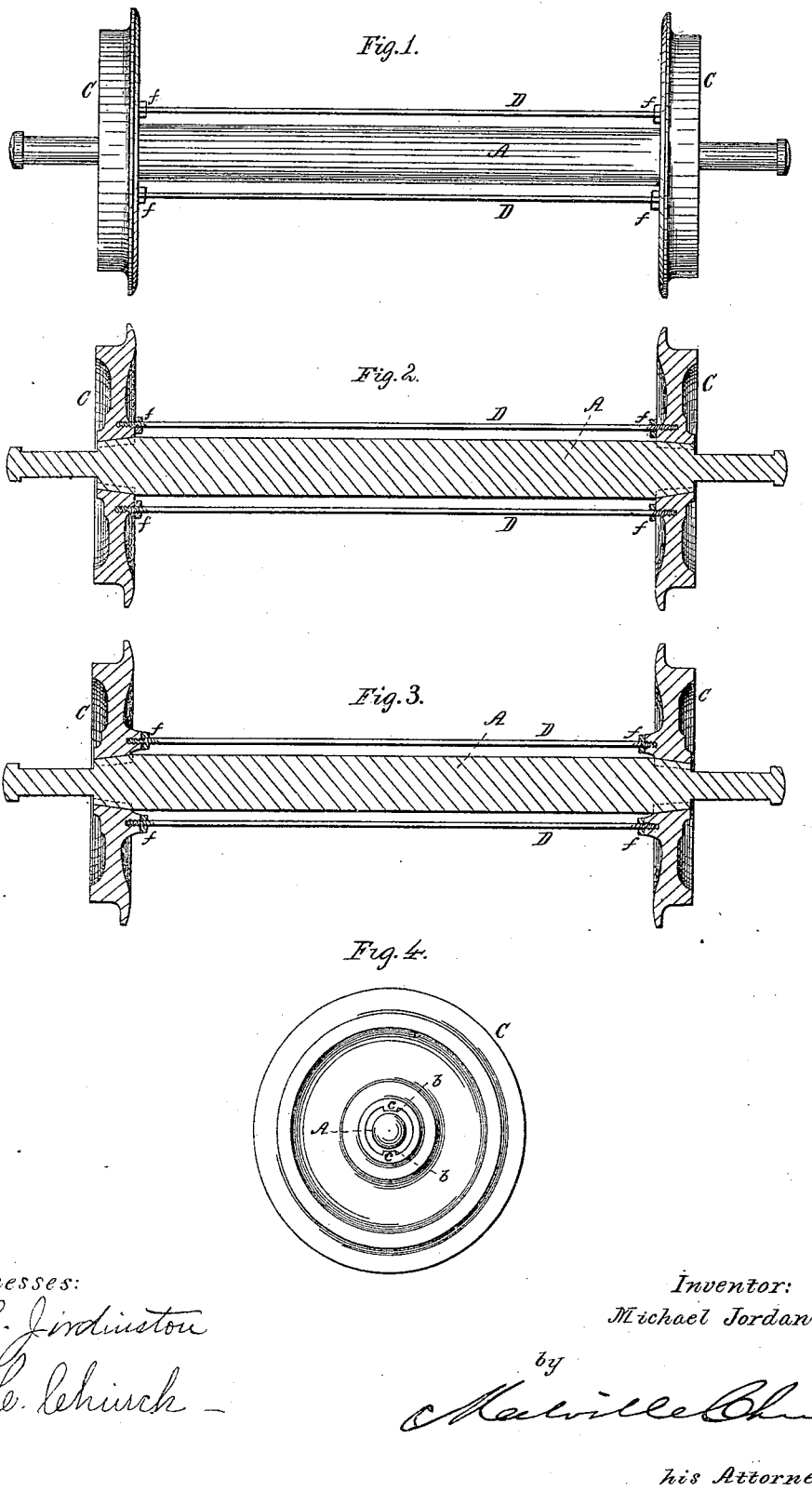

MICHAEL JORDAN, OF SCRANTON, PENNSYLVANIA.

CAR WHEEL AND AXLE.

SPECIFICATION forming part of Letters Patent No. 269,942, dated January 2, 1883.

Application filed November 4, 1882. (No model.)

*To all whom it may concern:*

Be it known that I, MICHAEL JORDAN, of Scranton, in the county of Lackawanna and State of Pennsylvania, have invented certain new and Improved Means for Attaching Car-Wheels to their Axles; and I do hereby declare the following to be a full, clear, and exact description of the same, reference being had to the accompanying drawings, forming a part of this specification, in which—

Figure is a side elevation of a pair of car-wheels attached to an axle in accordance with my invention. Fig. 2 is a longitudinal sectional view of the same. Fig. 3 is a view of a modification. Fig. 4 is an end elevation of the wheel and axle shown in Fig. 1.

Similar letters of reference in the several figures denote the same parts.

The mode of attaching cast-metal car-wheels to their axles, as at present generally practiced, consists in turning a true bearing upon the axle and a corresponding bearing in the wheel, and then, by a pressure of from twenty to thirty tons, forcing the wheel upon the axle. This process is an expensive and laborious one, and tends to impair the strength and durability of the wheel, and it is the object of my invention to improve upon it.

To this end my invention consists in providing suitable grooves in the bearing on the axle and corresponding tongues upon the bearing of the wheel, or vice versa, so that the said tongues and grooves will interlock when the wheel is slipped into position and prevent the latter from rotating, and in employing rods substantially parallel to the axle, and connected at opposite ends to the respective wheels, so as to draw the wheels toward each other and prevent them from slipping longitudinally off the axle, all as will be hereinafter explained.

In the accompanying drawings, A represents a car-axle, having its wheel-bearings *a* provided in this instance with grooves *b b* on opposite sides, and C C are the wheels, each provided on its bearing with tongues *c c*, corresponding in size and position to the grooves *b b*, and adapted to fit into the latter when the wheel is slipped on into place. The number of tongues and grooves may be increased or diminished as desired.

D D represent the cross-rods extending from wheel to wheel, and each preferably provided with right and left screw-threads at its respective ends, which engage with corresponding threaded perforations in the body of the wheels, as shown in Fig. 2, or in lugs *e* on the wheels, as shown in Fig. 3. By screwing up these rods the wheels are drawn close up against the shoulders on the axle and held there, rendering it impossible for them to slip or become displaced. I preferably employ jam-nuts *f f* for securing the rods in the positions to which they are adjusted.

By my invention the wheels are applied much more quickly and economically, and equally as securely as by the old process, while the liability of injury by being forced on under extreme pressure is obviated.

Having thus described my invention, I claim as new—

1. The combination, with the car-axle having the recesses or grooves in its wheel-bearings, of the wheels having tongues corresponding in number and position to the grooves in the axle, and co-operating with said grooves to prevent the rotation of the wheels on the axle, and rods extending from wheel to wheel and secured to the same, substantially as described.

2. The combination, with the car-axle having the recesses, of the wheels having the tongues corresponding in number and position to the recesses, and the rods provided with the right and left screw-threaded ends, and adapted, when rotated in the proper direction, to draw the wheels up close against the shoulders on the axle, substantially as described.

MICHAEL JORDAN.

Witnesses:
C. W. ROESLER,
T. B. HOWE.